United States Patent [19]
Francisco et al.

[11] Patent Number: 6,105,043
[45] Date of Patent: Aug. 15, 2000

[54] CREATING MACRO LANGUAGE FILES FOR EXECUTING STRUCTURED QUERY LANGUAGE (SQL) QUERIES IN A RELATIONAL DATABASE VIA A NETWORK

[75] Inventors: Grace Francisco, San Jose, Calif.; Michael Scott Goldberg, Incline Village, Nev.

[73] Assignee: International Business Machines Corporation, Armonk, N.Y.

[21] Appl. No.: 08/991,323

[22] Filed: Dec. 16, 1997

[51] Int. Cl.[7] ................................................ G06F 17/30
[52] U.S. Cl. .................... 707/513; 707/100; 707/500; 707/526; 707/2
[58] Field of Search ................ 707/4, 104, 103, 707/513, 2; 395/200.33; 345/326

[56] References Cited

U.S. PATENT DOCUMENTS

| | | | |
|---|---|---|---|
| 5,255,305 | 10/1993 | Sattar | 379/34 |
| 5,715,453 | 2/1998 | Stewart | 707/104 |
| 5,737,592 | 4/1998 | Nguyen et al. | 707/4 |
| 5,748,188 | 5/1998 | Hu et al. | 345/326 |
| 5,793,966 | 8/1998 | Amstein et al. | 395/200.33 |
| 5,913,029 | 6/1999 | Shostak | 345/357 |

*Primary Examiner*—Paul R. Lintz
*Assistant Examiner*—Ella Colbert
*Attorney, Agent, or Firm*—Kurdirka & Jobse, LLP

[57] ABSTRACT

A method, apparatus, and article of manufacture for creating macro language files for executing SQL queries in a relational database management system via the World Wide Web of the Internet. In accordance with the present invention, Web users can request information from RDBMS software via HTML input forms, which request is then used to create an SQL statement for execution by the RDBMS software. The results output by the RDBMS software are themselves transformed into HTML format for presentation to the Web user.

25 Claims, 14 Drawing Sheets

CREATING MACRO LANGUAGE FILES FOR EXECUTING STRUCTURED QUERY LANGUAGE (SQL) QUERIES IN A RELATIONAL DATABASE VIA A NETWORK

CROSS-REFERENCE TO RELATED APPLICATIONS

This application is related to co-pending and commonly-assigned patent application Ser. No. 08/491,742, filed Jun. 19, 1995, by Tam Minh Nguyen and Venkatachary Srinivasan, entitled "ACCESSING A RELATIONAL DATABASE OVER THE INTERNET USING MACRO LANGUAGE FILES," which application is incorporated by reference herein.

BACKGROUND OF THE INVENTION

1. Field of the Invention

This invention relates in general to database management systems performed by computers, and in particular, to a method, apparatus, and article of manufacture for creating macro language files for accessing a relational database over the Internet.

2. Description of Related Art

With the fast growing popularity of the Internet and the World Wide Web (also known as "WWW" or the "Web"), there is also a fast growing demand for Web access to databases. However, it is especially difficult to use relational database management system (RDBMS) software with the Web. One of the problems with using RDBMS software on the Web is the lack of correspondence between the protocols used to communicate in the Web with the protocols used to communicate with RDBMS software.

For example, the Web operates using the HyperText Transfer Protocol (HTTP) and the HyperText Markup Language (HTML). This protocol and language results in the communication and display of graphical information that incorporates hyperlinks. Hyperlinks are network addresses that are embedded in a word, phrase, icon or picture that are activated when the user selects a highlighted item displayed in the graphical information. HTTP is the protocol used by Web clients and Web servers to communicate between themselves using these hyperlinks. HTML is the language used by Web servers to create and connect together documents that contain these hyperlinks.

In contrast, most RDBMS software uses a Structured Query Language (SQL) interface. The SQL interface has evolved into a standard language for RDBMS software and has been adopted as such by both the American National Standards Institute (ANSI) and the International Standards Organization (ISO).

Thus, there is a need in the art for methods of accessing RDBMS software across the Internet network, and especially via the World Wide Web. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method, apparatus, and article of manufacture for creating macro language files for executing SQL queries in a relational database management system via the World Wide Web of the Internet. In accordance with the present invention, Web users can request information from RDBMS software via HTML input forms, which request is then used to create an SQL statement for execution by the RDBMS software. The results output by the RDBMS software are themselves transformed into HTML format for presentation to the Web user.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overveiw

With the fast growing popularity of the Internet and the World Wide Web (also known as "WWW" or the "Web"), there is also an increasing demand for Web access to relational databases. The present invention generates macro language files for a DB2 WWW gateway that facilitates communication between Web clients, Web servers, and servers executing RDBMS software such as IBM's DB2 family of products. The DB2 WWW gateway enables an application developer to build Web applications for the RDBMS software using HTML, forms and dynamic SQL.

An end user of these applications sees only the Input forms for his/her requests and the resulting reports. Users fill out the Input forms, point and click to navigate the forms, and to access the RDBMS software and relational database. A complete SQL command is dynamically built by the DB2 WWW gateway with the user inputs and sent to the server executing the RDBMS software. The SQL command is performed by the RDBMS software, and the resulting output is merged into the HTML forms by the DB2 WWW gateway for presentation to the user.

An application developer creates HTML forms and SQL queries and stores them in macro language files at the computer executing the DB2 WWW gateway. The macro language provides "cross-language variable substitution" or "common name space substitution", thus enabling the application developer to use the full capabilities of: (a) HTML for creation of query or Input forms and Report forms, and (b) SQL for queries and updates. Since the DB2 WWW gateway uses native HTML, and SQL languages, and not some new or hybrid language, various off-the-shelf tools may be used for creation of HTML forms and for generation of the SQL query.

Hardware Environment

Figure 1:
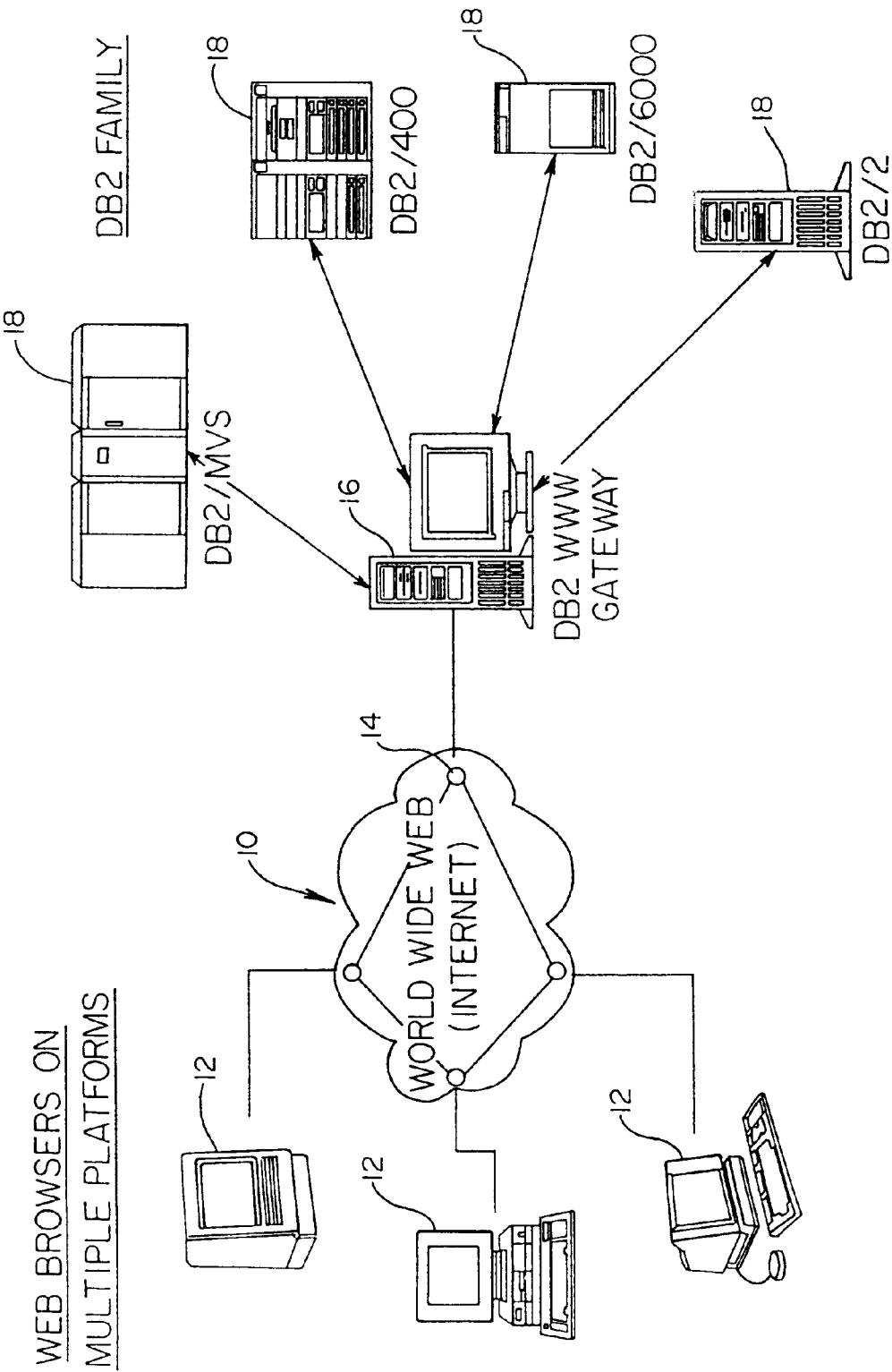
FIG. 1 schematically illustrates the hardware environment of the preferred embodiment of the present invention.

FIG. 1 schematically illustrates the hardware environment of the preferred embodiment of the present invention, and more particularly, illustrates a typical distributed computer system using the Internet 10 to connect client systems 12 executing Web browsers to server systems 14 executing Web daemons, to connect the server systems 14 executing Web daemons to server systems 16 executing the DB2 WWW gateway, and to connect the server systems 16 executing DB2 WWW gateways to server systems 18 executing the RDBMS software. A typical combination of resources may include clients 12 that are personal computers or workstations, and servers 14, 16, and 18 that are personal computers, workstations, minicomputers, or mainframes. These systems are coupled to one another by various networks, including LANs, WANs, SNA networks, and the Internet.

A client system 12 typically executes a Web browser and is coupled to a server computer 14 executing a Web server. The Web browser is typically a program such as IBM's Web Explorer, or NetScape or Mosaic. The Web server 14 is typically a program such as IBM's HTTP Daemon or other WWW daemon. The client computer 12 is bi-directionally coupled with the server computer 14 over a line or via a wireless system. In turn, the server computer 14 is bi-directionally coupled with a DB2 WWW server 16 over a line or via a wireless system. In addition, the DB2 WWW server 16 is bi-directionally coupled with a RDBMS server 18 over a line or via a wireless system.

The DB2 WWW gateway 16 supports access to a server 18 executing the RDBMS software. The DB2 WWW gateway 16 and RDBMS server 18 may be located on the same server as the Web server 14, or they may be located on separate machines. The servers 18 executing the RDBMS software may be geographically distributed and may comprise different vendor systems, such as a DB2, ORACLE, SYBASE, etc.

Those skilled in the art will recognize many modifications may be made to this configuration without departing from the scope of the present invention. For example, in a two-tier configuration, the server system executing the functions of the DB2 WWW gateway 16 may also execute the functions of the Web server 14 and/or the RDBMS server 18. Alternatively, in a three-tier configuration, the Web server 14, DB2 WWW gateway 16, and RDBMS server 18 may all be performed by different servers.

DB2 WWW Gateway

The DB2 WWW gateway 16 is designed to be sufficiently flexible and powerful, yet be available on multiple platforms, such as OS/2, AIX, MVS, etc. Further, the DB2 WWW gateway 16 is designed to work with existing Web and database application development tools, with minimal modifications required to such tools.

These goals led also to the development of the macro language of the present invention. The macro language is a combination of HTML and SQL, and incorporates a "cross-language variable substitution" or "common name space substitution" mechanism that allows input data from an HTML-format Input form to be inserted in an SQL-format query for the RDBMS software. The "cross-language variable substitution" or "common name space substitution" mechanism also allows SQL query results to be merged into HTML Report forms.

The runtime engine of the DB2 WWW gateway 16 reads the macro language files to generate the appropriate query or Input forms, SQL queries, and Report forms. The use of native HTML and SQL, instead of a new or hybrid language, allows the full expressive power of these languages without artificial limitations. Both query and Report forms can be laid out in any fashion.

Moreover, the present invention provides a tools for generating the macro language files. Specifically, a database management system executing on a client system can be used to generate both the HTML forms component and the SQL query component.

Interaction Among Components

Figure 2:
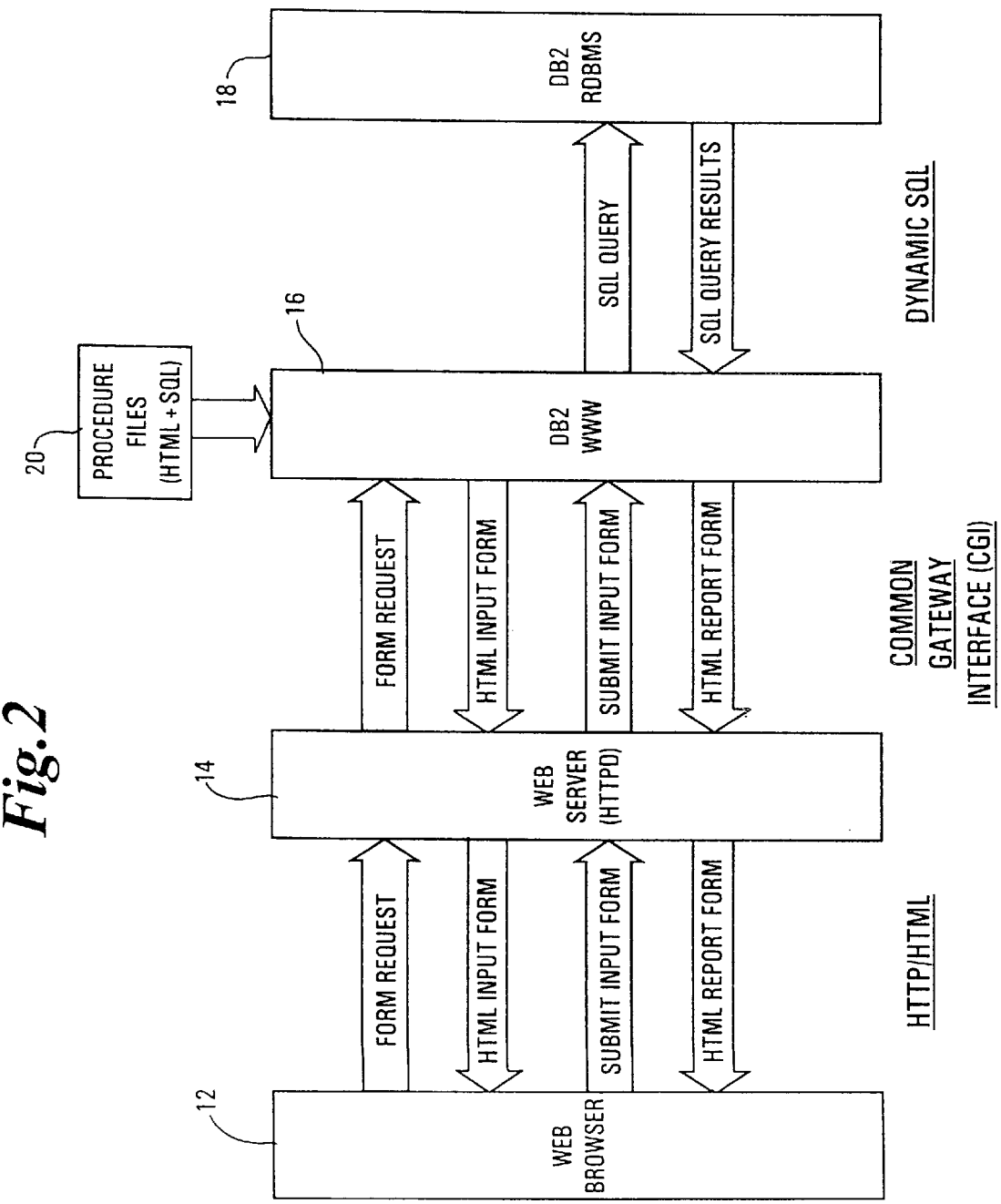
FIG. 2 shows schematically an overview of the preferred embodiment of the present invention, and in particular, shows the interaction among components in the present invention.

FIG. 2 shows schematically an overview of the preferred embodiment of the present invention, and in particular, shows the interaction among components in the present invention. The user interacts with the Web browser executing on a client computer 12 remotely located from the Web server 14. At some point, the user executes an HTTP command via the Web browser 12 that results in communication with an HTTP daemon executing on the Web server 14. The Web server 14 would then transmit an initial or home page in HTML format to the Web browser 12 for presentation to the user. The DB2 WWW gateway 16 would be invoked by the user selecting a hyperlinked item from the home page. It is envisioned that the DB2 WWW gateway 16 conforms to the Common Gateway Interface (CGI) defined for Web servers 14, and thus can be invoked from an HTML page in one of two ways: either by an HTTP anchor reference or by an HTTP form action.

An HTTP anchor reference would typically be formatted as follows: "<A HREF=http://{web-server}/{cgi-name}/{db2-www-gateway}/{macro-language-file}/{command}[?variable-name=variable-value & ... ]>".

An HTTP form action would typically be formatted in a similar manner as follows: "<FORM METHOD={method}ACTION=http://{web-server}/{cgi-name}/{db2-www-gateway}/{macro-language-file}/{command}[?variable-name=variable-value & ... ]>".

In both of the above examples, the following parameters are used:

"{web-server}" identifies the Web server 14;

"{cgi-name}" identifies the Common Gateway Interface (CGI) to the DB2 WWW gateway 16;

"{db2-www-gateway}" identifies the DB2 WWW gateway 16;

"{macro-language-file}" is the name of the macro language file 20 to be executed;

"{command}" is generally either "input" or "report". If "input", then an HTML Input form is displayed for the end user. If "report", then SQL commands in the {macro-language-file} are executed and an HTML Report form is displayed for the end user.

"{method}" is either "GET" or "POST", as specified under the HTML standard;

"[?variable-name=variable-value & . . . ]" are optional parameters that may be passed to the macro language file executed by the DB2 WWW gateway 16.

At some point in the interaction between the Web browser 12, the Web server 14, and the DB2 WWW gateway 16, the user would request data from a relational database managed by an RDBMS server 18. The DB2 WWW gateway 16 would retrieve a macro language file 20, extract an HTML Input form from the macro language file 20, and transmit the HTML Input form to the Web server 14. The Web server 14 transmits the HTML Input form to the Web browser 12 for display to the user.

The user manipulates the HTML Input form via the Web browser 12, by selecting functions and/or entering data into input boxes. When the user invokes a "submit" or "post" command, the data from the HTML Input form, along with the command, is transmitted from the Web browser 12 to the Web server 14. The command would comprise a universal resource locator (URL) that invokes communications between the Web server 14 and the DB2 WWW gateway 16.

The DB2 WWW gateway 16 extracts the user inputs from the HTML Input form, retrieves the associated macro language file 20, and substitutes these inputs into an SQL query from the macro language file 20. The DB2 WWW gateway 16 then transmits the SQL query to the RDBMS server 18 for execution. After performing an SQL query, the RDBMS server 18 returns the results of the SQL query, i.e., an output table, to the DB2 WWW gateway 16. The DB2 WWW gateway 16 extracts data from the output table and substitutes it into an HTML Report form from the macro language file 20 using a common name space. A common name space arises from the use of common variables in both the HTML and SQL statements in the macro language file, and the cross-language variable substitution mechanism of the present invention. The resulting HTML Report form is transmitted by the DB2 WWW gateway 16 to the Web server 14. The Web server 14 transmits the HTML Report form to the Web browser 12 for presentation to the user. This interaction between the Web browser 12, the Web server 14, the DB2 WWW gateway 16, and the RDBMS server 18 may continue in a similar manner according to the user's direction.

Development Environmemt

Figure 3:
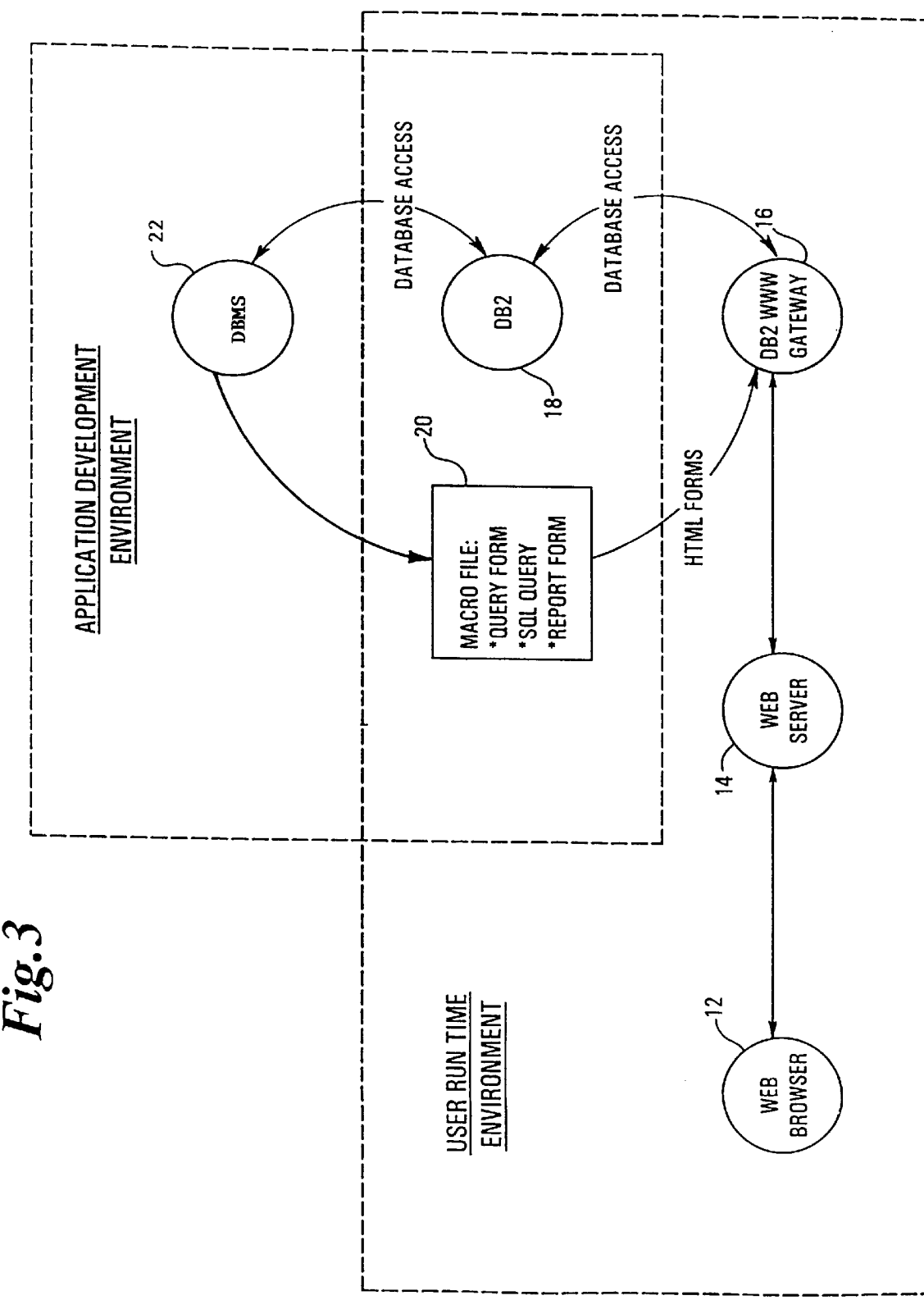
FIG. 3 shows schematically an overview of the preferred embodiment of the present invention, and in particular, shows the relationship between the user runtime environment and the application development environment of the present invention.

FIG. 3 shows schematically an overview of the preferred embodiment of the present invention, and in particular, shows the relationship between the user runtime environment and the application development environment of the present invention.

As mentioned earlier, the runtime environment includes the interaction between clients 12 executing Web browsers and Web servers 14, DB2 WWW gateways 16, and RDBMS servers 18. Access to the RDBMS server 18 and associated relational database via the DB2 WWW gateway 16 is controlled by programming stored in macro language files 20.

According to the present invention, the development of Web applications for accessing relational databases typically involves the following steps:

1. Create an HTML Input form for display to the user;
2. Extract user inputs from HTML Input forms and generate the appropriate SQL query via a common name space using a variable substitution mechanism;
3. Merge the SQL query results into an HTML Report form; and
4. Allow for additional queries and HTML forms, possibly from the hyperlinks embedded in the HTML Report forms.

The key challenge in writing applications for the DB2 WWW gateway 16 is to understand both HTML and SQL languages, since these languages are embedded inside the macro language files 20. In its simplest forms, basic knowledge of SQL and HTML can be easily acquired. However, these languages can be quite complex and tedious to write in order to utilize their advanced functions. Fortunately, the application development environment of the present invention comprises a database management system (DBMS) 22 can help to greatly reduce the complexity of writing the macro language files. Using the DBMS 22, the application developer creates the macro language files 20, wherein each of the macro language files 20 containing SQL commands and the associated Input and Report forms in HTML format. In the preferred embodiment, the DBMS 22 comprises the Approach™ database management system sold by Lotus Development Corporation, a wholly-owned subsidiary of IBM Corporation, the assignee of the present invention.

The DBMS 22 is preferably executed by a computer, such as a personal computer or workstation, that may be connected to the DB2 WWW gateway 16 to store the macro language files 20 thereon. The DBMS 22 is comprised of instructions which, when read and executed by the computer, causes the computer to perform the steps necessary to implement and/or use the present invention. Generally, the DBMS 22 is embodied in and/or readable from a device, carrier, or media, such as memory, data storage devices, and/or a remote device coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Graphical User Interface

FIGS. 4A–4F are "snapshots" of a DB2 Web Sizing Assistant that comprises at least a portion of the graphical user interface displayed on a monitor of a computer by the DBMS 22 that comprises the application development environment of the present invention. These snapshots illustrate an exemplary sequence of events during the operation of the DB2 Web Sizing Assistant.

The Web Sizing Assistant displays a dialogue box 24 with five tabs along the top edge of the dialogue box 24, wherein each of the tabs changes the display of the dialogue box 24. The available tabs are: "Step 1: Open"; "Step 2: Form/Report"; "Step 3: Input"; "Step 4: SQL"; and "Step 5: WWW." The buttons include CANCEL, BACK, NEXT, and DONE, wherein the CANCEL button allows a developer to terminate the Web Sizing Assistant, the BACK and NEXT buttons allow the developer to move back and forth between displays of the dialogue box 24, the DONE button allows the developer to complete the sequence of selections. The following paragraphs provide a detailed description of the functions provided by each of the displays of the dialogue box 24.

Figure 4A:
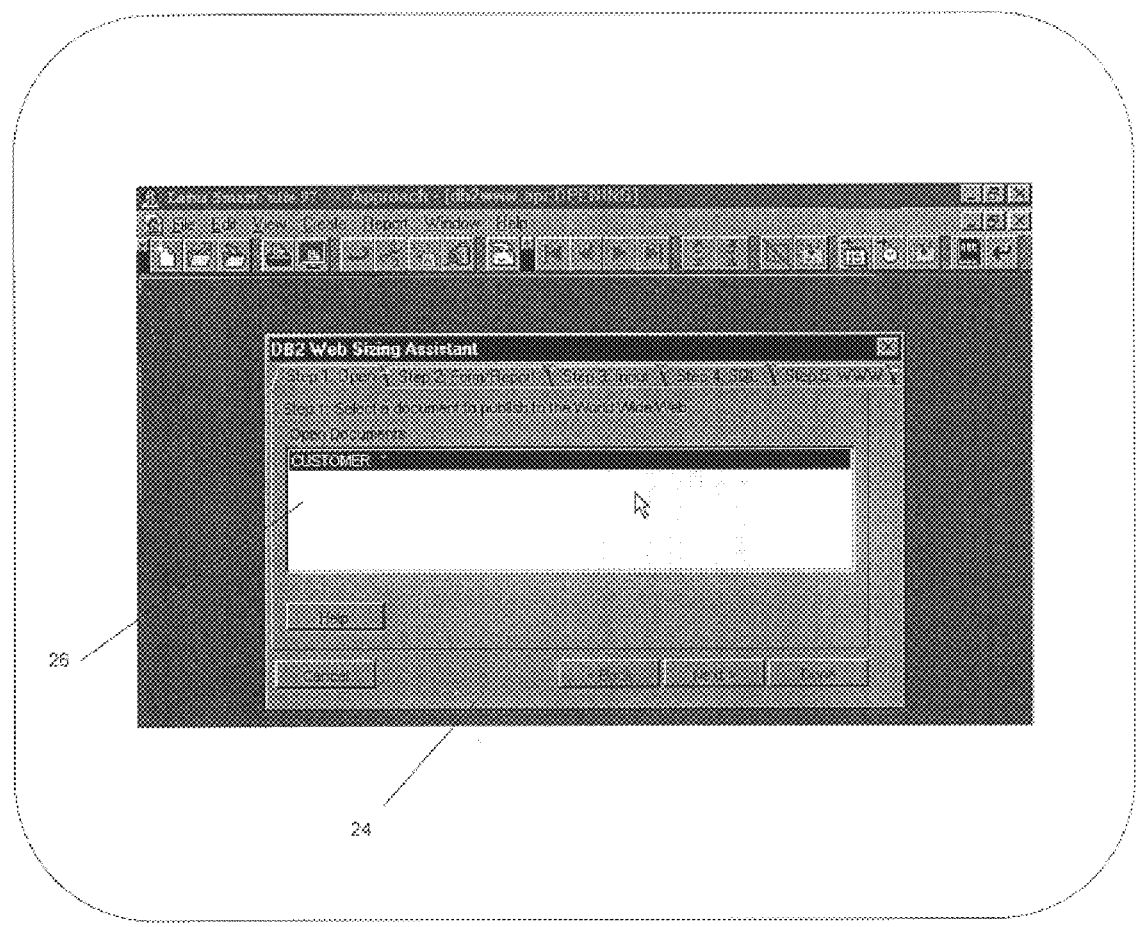
FIGS. 4A–4F are "snapshots" of a DB2 Web Sizing Assistant that comprises at least a portion of the graphical user interface displayed on a monitor of a computer by a database management system that comprises the application development environment of the present invention.

FIG. 4A shows the "Step 1: Open" display of the dialogue box 24. This display of the dialogue box 24 allows the developer to select a document (i.e., application) to publish to the DB2 WWW gateway 16 as a macro language file 20. In the preferred embodiment, this display of the dialogue box 24 includes a list of all documents 26 available to the developer. Once the document is selected, the developer selects the Next button to proceed to the "Step 2: Form/Report" display of the dialogue box 24 shown in FIG. 4B. The developer can also choose the document by clicking on the File and Open menu bar options.

Figure 4B:
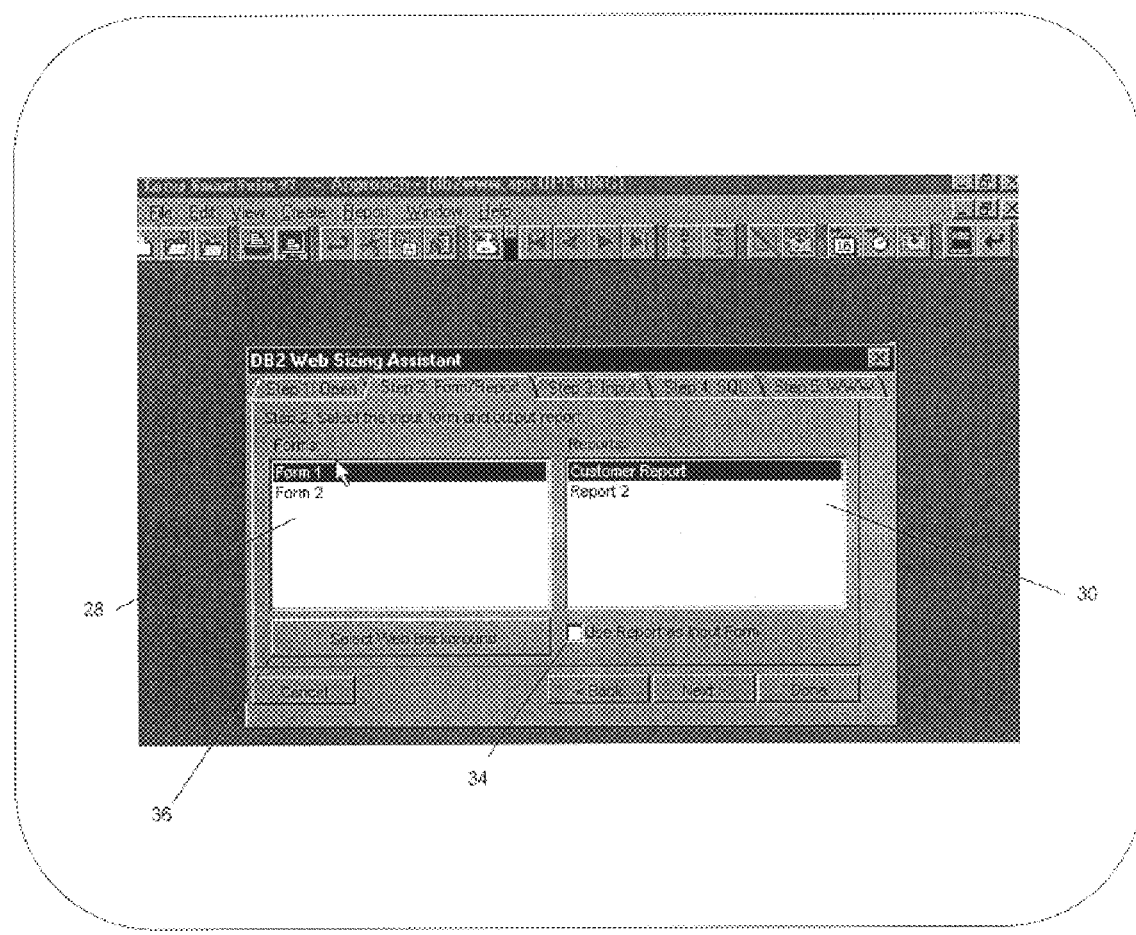

FIG. 4B shows the "Step 2: Form/Report" display of the dialogue box 24. This display of the dialogue box 24 includes two list boxes, one for HTML Input forms 28 and one for HTML Report forms 30. Generally, a list of all available forms and reports are displayed and the developer selects and associates both an Input form and a Report form. A Report form can also be used as the Input form by checking box 34. The developer can also select an image to use for the background of both the HTML Input and Report forms and by clicking on the "Select Web Background" button 36. Once the Input and Report forms have been selected, the developer selects the Next button to proceed to the "Step 3: Input" display of the dialogue box 24 shown in FIG. 4C.

Figure 4C:
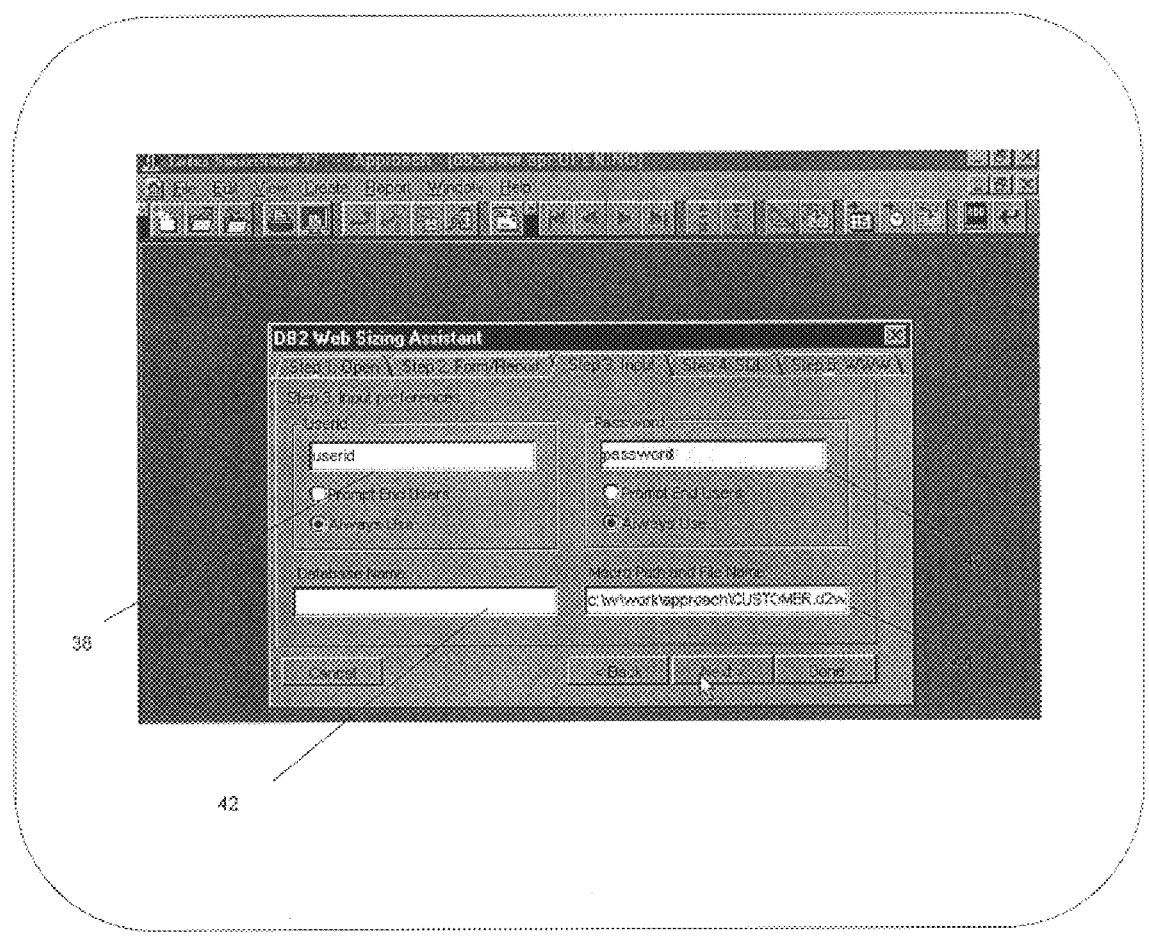

FIG. 4C shows the "Step 3: Input" display of the dialogue box 24. In this display of the dialogue box 24, the developer specifies the USERID and PASSWORD to be used in accessing the RDBMS server 18 in fields 38 and 40, respectively. If common USERID and PASSWORD are to be used by all users in accessing the RDBMS server 18, then the USERID and PASSWORD are entered into the fields 38 and 40, respectively, and the radiobutton "Always Use" is selected. If each user is to be prompted for a USERID and PASSWORD for accessing the RDBMS server 18, then the radiobutton "Prompt End Users" is selected. The developer also specifies a database name in the "Database Name" field 42 and a path for storing the macro language file 20 in the "Macro Path and File Name" field 44. Thereafter, the developer selects the Next button to proceed to the "Step 4: SQL" display of the dialogue box 24 shown in FIG. 4D.

Figure 4D:
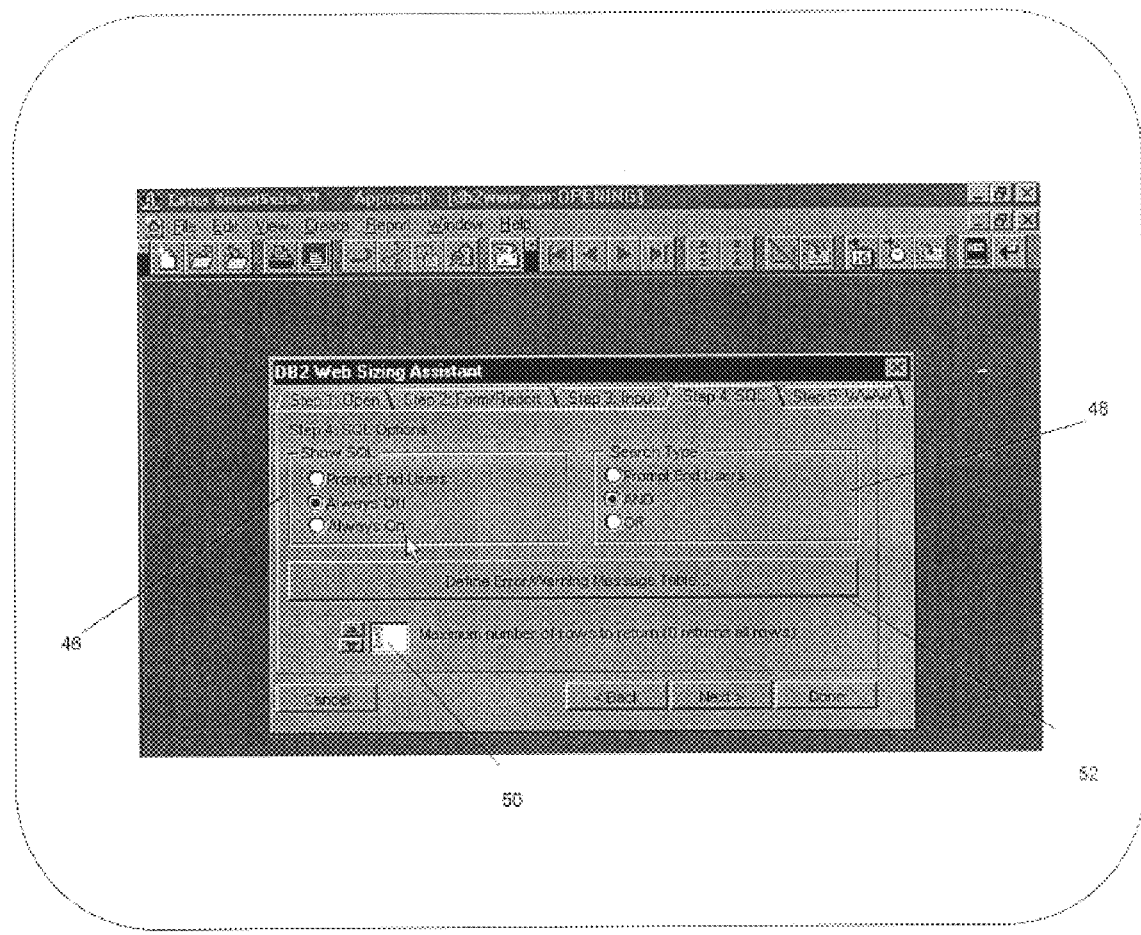

FIG. 4D shows the "Step 4: SQL" display of the dialogue box 24. This display of the dialogue box 24 allows the developer to select SQL display options, search options, and error message options. The radiobuttons in the "Show SQL" section 46 define whether the SQL being generated and sent to RDBMS server 18 is displayed to the user, wherein one of the following options may be selected by the radiobuttons:

Prompt End Users—Prompt users whether they want to display the SQL statement on the Report form.

Always Off—Never display the SQL statement on the Report form.

Always On—Always display the SQL statement on the Report form.

The radiobuttons in the "Search Type" section 48 define what type of search is being implemented, wherein one of the following options may be selected by the radiobuttons:

Prompt End Users—Prompt users for the type of search on the Input form.

AND—The search type comprises "ANDed" fields of the Input form.

OR—The search type comprises "ORed" fields of the Input form.

The developer can specify the "Maximum number of rows to return" in field 50 is used to define the maximum number of rows returned from the RDBMS server 18 that will be displayed in the HTML Report form, wherein a value of 0 returns all rows.

Figure 4E:
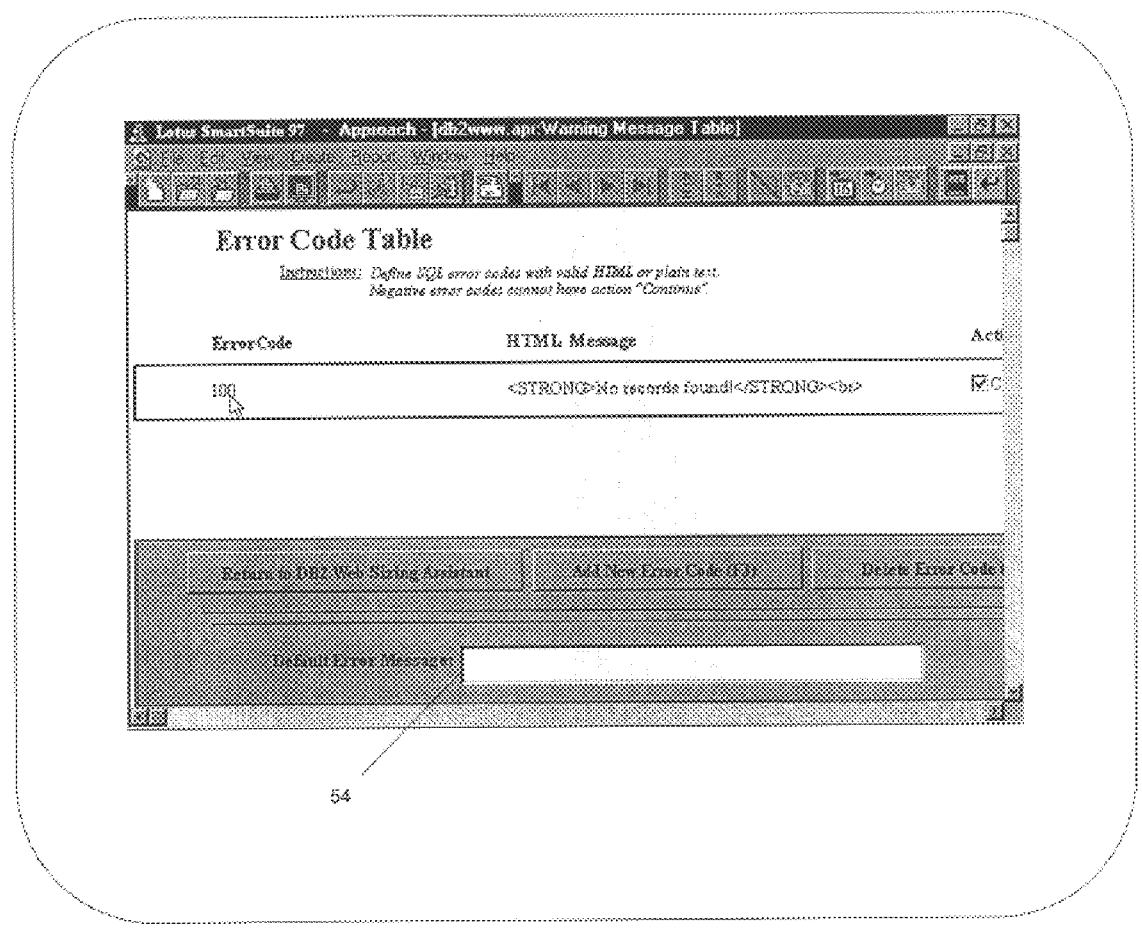

The "Define Error/Warning Message Table . . . " button 52 allows the developer to define error/warning messages for SQL error codes returned by the RDBMS server 18. An exemplary error/warning message table is shown in FIG. 4E, wherein the table includes an error code, an HTML message to be transmitted to the user upon receipt of the associated error code, and a checkbox for specifying "Continue" actions. If "Continue" is specified, then after the error/warning message is displayed upon occurrence of an error, the remainder of the HTML Report form is displayed; otherwise, the HTML Report form is not displayed upon occurrence of the error. Note that, in the preferred embodiment, the "Continue" checkbox can only be used with positive error codes, but not with negative error codes (and thus the HTML Report form is not displayed).

The developer also has the option of entering a default error message in field 54. If an error/warning occurs for which there is no corresponding entry in the error/warning message table, the default error message is used. If no default error message is specified, the error message returned from the RDBMS server 18 is displayed.

Once the Error/Warning Message Table has been defined, the developer selects the Return to DB2 Web Sizing Assistant to return to the "Step 4: SQL" display of the dialogue box 24 shown in FIG. 4D. Thereafter, from FIG. 4D, the developer selects the Next button to proceed to the "Step 5: WWW" display of the dialogue box 24 shown in FIG. 4F.

Figure 4F:
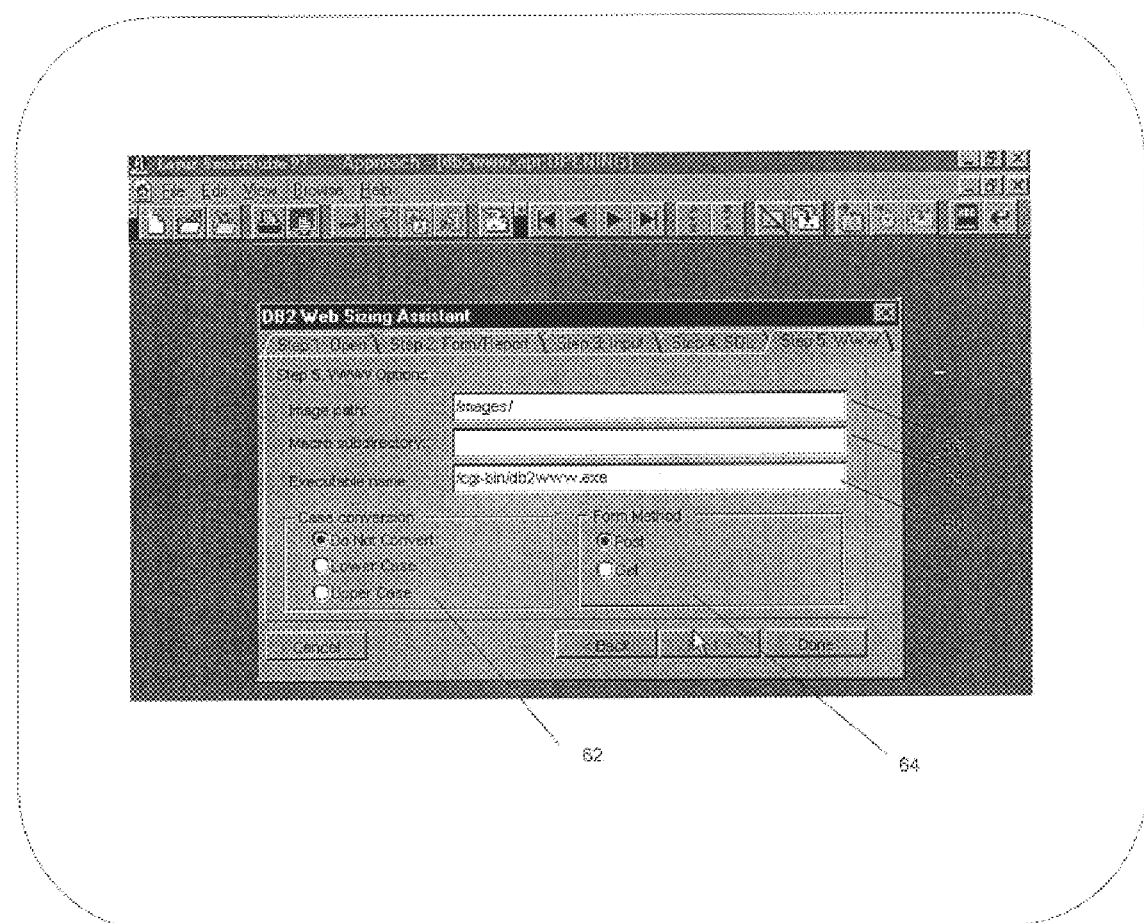

FIG. 4F shows the "Step 5. WWW" display of the dialogue box 24. In this display of the dialogue box 24, the developer specifies the image path in field 56, the subdirectory for the macro language file 20 in field 58, and the executable name of the macro language file 20 in field 60.

The radiobuttons in the "Case conversion" section 62 define whether user input is converted before being transmitted, wherein one of the following options may be selected by the radiobuttons:

Do Not Convert—Any data that the user enters on the HTML Input form will be left in the case entered by the user.

Lower Case—Any data that the user enters on the HTML Input form will be converted to lower case before the query is submitted.

Upper Case—Any data that the user enters on the HTML Input form will be converted to upper case before the query is submitted.

The radiobuttons in the "Form Method" section 64 define what type of search is being implemented, wherein one of the following options may be selected by the radiobuttons:

Post—This method causes the data entered by the user in the Input form to be sent to the Web server 14 in the body of a message. (recommended method)

Get—This method causes the data entered by the user in the Input form to be appended to the URL.

Thereafter, the developer selects the Done button, which causes the Web Sizing Assistant to generate the macro language file 20, as defined in more detail below.

Macro Language Definitions

According to the preferred embodiment of the present invention, each macro language file typically contains three sections:

1. An SQL command section identified as follows:
   %SQL {sql command section %}
2. An HTML Input form section identified as follows:
   %HTML_INPUT {html input form section %}
3. An HTML Report form section identified as follows:
   %HTML_REPORT {html report form section %}

The macro language contains directives, which are reserved keywords with a prefix symbol "%" (e.g. %SQL). Many of the directives have both a single line form and a block form, which supports multiple lines of text. These block directives are terminated with "%}", which can be anywhere on a line. In the preferred embodiment, nestings of blocks are not allowed, with the exception of the %EXEC-SQL block for the Report form as described below.

SQL Directive

The SQL directive has the following format:

%SQL {any-valid-sql-commands-on-1-line%} or

%SQL
{
any-valid-sql-commands-on-1-or-more-lines
%}

The SQL directive identifies one or more SQL commands for execution by the RDBMS software. These SQL commands are executed sequentially, and the query results, if any, from the SQL commands are returned to the user for display.

HTML Input Form Directive

The HTML Input form directive has the following format:

%HTLM_INPUT {any-valid-html-text-on-1-line%} or

%HTML_INPUT
{
any-valid-html-text-on-1-or-more-lines
%}

The HTML Input form directive contains the HTML commands comprising the Input form used to accept input data from the user before generating the SQL query. The HTML Input form section is needed only when user input is required to complete the SQL query.

HTML Report Form Directive

The HTML Report form directive has the following format:

%HTML_REPORT{any-valid-html-text-on-1-lines%} or

%HTML_REPORT
{
any-valid-html-text-on-1-or-more-lines
%EXECSQL {%}
any-valid-html-text-on-1-or-more-lines
%}

The HTML Report form directive contains the HTML commands used to format query results for display to the user. The %EXECSQL sub-directive contains SQL commands to execute, as well as the query result variables and how they are to be formatted in the report. Any HTML commands before and after the %EXECSQL block may contain hyperlinks to other HTML pages or macro language files 20. Note, too, that if the %HTML_REPORT directive is missing, then a default table format is used to print out the query results.

Comment Directive

The HTML comment directive has the following format:

%{any-text-on-1-line%} or

%}
any-text-on-1-or-more-lines
%}

The comment directive contains the comments to be inserted anywhere in the macro language file 20, so long as it is not nested inside another component block. The terminating symbol "%}" is required for terminating comments on a single line.

DEFINE Directive

The DEFINE directive has the following format:

%DEFINE define-statement or

%DEFINE
{
define-statement-1
define-statement-2
...
%}

The DEFINE directive defines the variables used in the macro language file 20. The "define-statement" above may be one of the following:

1. A simple variable assignment:
   varname="string-value"
2. A conditional variable assignment:
   varname=varname2 ? "value1":"value2"
3. A list variable declaration:
   %LIST "value-separator" varname The DEFINE directive defines the value strings that are to be substituted for the specified variables. When referenced, a simple variable is always substituted with the value string. A conditional variable is substituted with the first value string, if the tested variable name exists and is not null, or it is substituted with the second value string. A list variable is declared in the DEFINE section with the list property, wherein multiple value strings assigned to the list variable are concatenated together with the value-separator in between.

The conditional and list variables are typically used together to construct portions of the SQL clause based on user inputs and selections from the HTML Input and Report forms. The value-strings may contain other variables, which are de-referenced when used.

Variables may contain other variables. For example:

%DEFINE var1="$(var2).abc"

is permitted. However, circular references (i.e., cycles) are not allowed. For example, the DEFINE declarations below are not allowed:

%DEFINE a="$(b)"
%DEFINE b="$(a)"

A quote character (") may be included in a value string by using two consecutive quotes (" "). Further, an empty string with two consecutive quotes is equivalent to a NULL string. For example, the DEFINE sections:

%DEFINE x="say ""hello"""

%DEFINE y=" "

result in the variable x with the value 'say "hello"' and variable y with the value NULL. By definition, undefined variables are equivalent to NULL variables.

Variable Substitution

The "cross-language variable substitution" mechanism of the present invention is a key feature of the macro language, which allows:

1. Input data from the HTML Input forms to be inserted into the SQL statements; and
2. SQL query results to be merged into HTML Report forms.

The macro language allows variables to be defined in one of several ways:

1. DEFINE declaration.
   For example: %DEFINE varname="value-string"
2. HTML form's <SELECT> and <INPUT> statements.
   For example:
   <INPUT NAME="varname1"> or <SELECT NAME="varname2">. These variables are set by user inputs or preset by hidden fields in the HTML forms.
3. Query result variables are automatically set by the DB2 WWW gateway 16 with the values from the SQL query results.

Variables are referenced in the macro language by using the syntax "$(variable)", wherein "variable" is the variable name. Variable references may appear in either SQL or HTML sections and nested variable references are allowed. However, at the time of its use, all variables must be de-referenced to their final values. Variables that have not been defined before use will be treated as having a value equal to an empty or null string.

As previously described, a variable may contain other variables (e.g., %DEFINE varx=" . . . $(var2) . . . "). Variables are de-referenced (substituted with their values) in an HTML section, where the values of these variables need to be printed out either for the HTML Input form or the HTML Report form. However, variables are not de-referenced at the time of their use in a %DEFINE section. Consider the examples below:

%DEFINE X="One$(Y)$(Z)"

%DEFINE Y="Two"

%HTML_INPUT {$(X)%}

%DEFINE Z="Three"

Variable X contains references to variables Y and Z. When the HTML input section is processed, Y is already defined, but Z is still undefined and is equivalent to NULL. Thus, $(X) is substituted with "One Two".

In addition, a "hidden variables" mechanism is available for the application developer to hide database internal structure (e.g., table and column names) and other sensitive information from the end user (because end users can view HTML source via their Web Browser). This is achieved by the following process:

1. Define a variable for each string that should be hidden, and put the DEFINE section for these variables after the HTML section where the variables are referenced, but before the SQL section where they are typically used.
2. In the HTML form section where the variables are referenced, use double dollar instead of single dollar to reference the variables (e.g. $$(X) instead of $(X)).

Consider the following example:

```
%HTML_INPUT
{
<FORM ...>
Please select field to view:
<SELECT NAME="Field">
<OPTION VALUE="$$(name)">Name
<OPTION VALUE="$$(addr)">Address
...
<FORM>
%}
%DEFINE{
name = "customer.name"
addr = "customer.address"
%}
%SQL SELECT $(Field) FROM customer
...
```

When the HTML input section is processed to return a form back to the user, $$(name) and $$(addr) are replaced with $(name) and $(addr). Hence, the real table and column values never appear on the HTML form. When the user submits the Input form, the SQL section is processed and "$(Field)" is properly substituted with "customer.name, customer, addr".

There are also a number of "special system variables" that have special meaning to the DB2 WWW gateway 16. These special variables may be defined by the application development environment in the macro language file 20 as described above or by the user from an Input form. The current special variables include:

DATABASE: name of the database to be accessed; this variable must be defined.

USERID: database userid.

PASSWORD: database password associated with USERID.

SHOWSQL: flag to show the SQL command on the Report form; default is NULL.

In addition, predefined query report variables are available and currently include:

$(FN1), $(FN2), . . . , $(FNn): field names for each of the columns defined in the table.

$(FV1), $(FV2), . . . , S(FVn): row values for each of the columns defined in the table.

$(NR): total number of rows or records retrieved by the query.

Flowcharts

Flowcharts which illustrate the logic of the Web Sizing Assistant and the use of the macro language files are shown in FIGS. 5, 6, 7, 8 and 9. Those skilled in the art will recognize that this logic is provided for illustrative purposes only and that different logic may be used to accomplish the same results.

In the preferred embodiment, the various operations described below are specifically related to the Web Sizing Assistant of the Approach database management system. Of course, those skilled in the art will recognize that other functions could be used in the Web Sizing Assistant without departing from the scope of the present invention.

Figure 5:
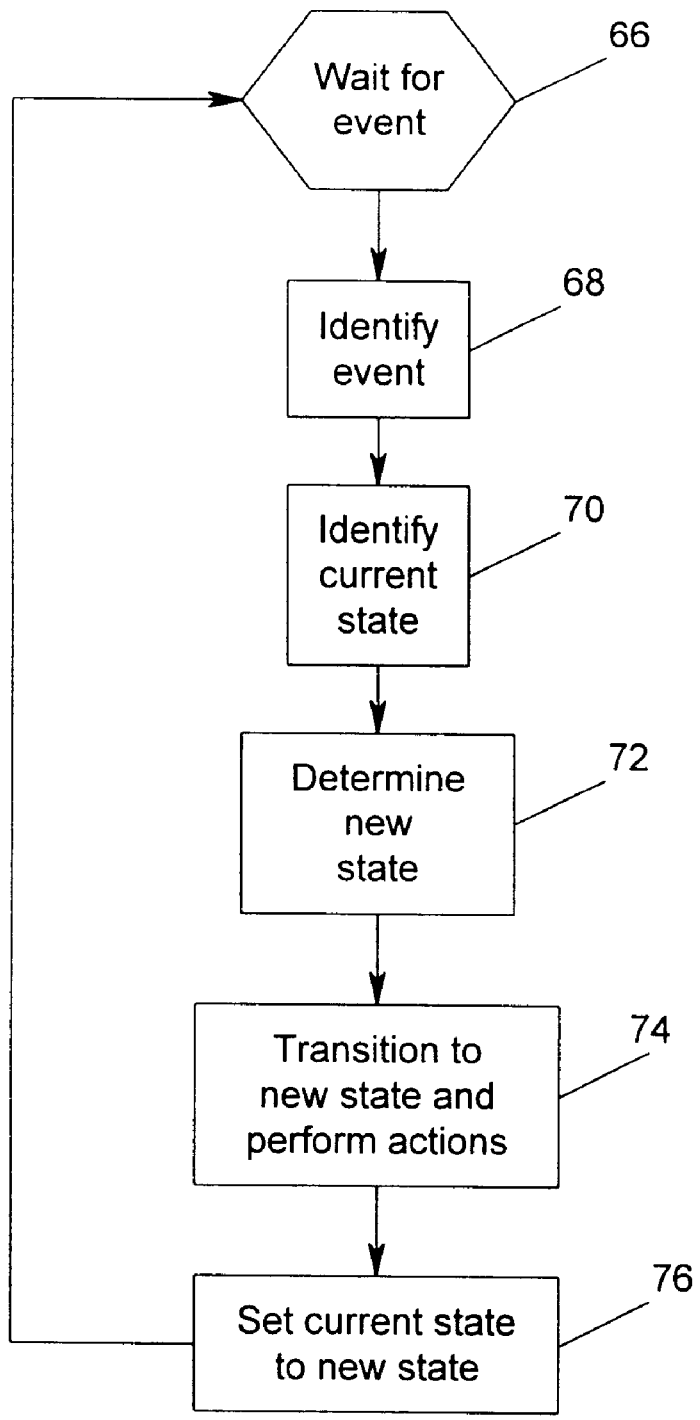
FIG. 5 is a flowchart that illustrates the general logic of a message or event-driven database management system performing the steps of the present invention.

FIG. 5 is a flowchart that illustrates the general logic of a message or event-driven DBMS 22 performing the steps of the present invention. In such a DBMS 22, operations are performed when transitions are made, based upon the receipt of messages or events, from present or current states to new states.

Generally, the flowchart begins by waiting at block 66 for an event (e.g., a mouse button click). It should be appreciated that during this time, other tasks, e.g., by the operating system or other computer programs, may also be carried out. When an event occurs, control passes to block 68 to identify the event. Based upon the event, as well as the current state of the system determined in block 70, a new state is determined in block 72. In block 74, the logic transitions to the new state and performs any actions required for the transition. In block 76, the current state is set to the previously determined new state, and control returns to block 66 to wait for more input events.

The specific operations that are performed by block 76 when transitioning between states will vary depending upon the current state and the event. The various operations required to implement and maintain the Web Sizing Assistant of the present invention represent particular events handled by the logic. However, it should be appreciated that these operations represent merely a subset of all of the events handled by the computer.

Figure 6:
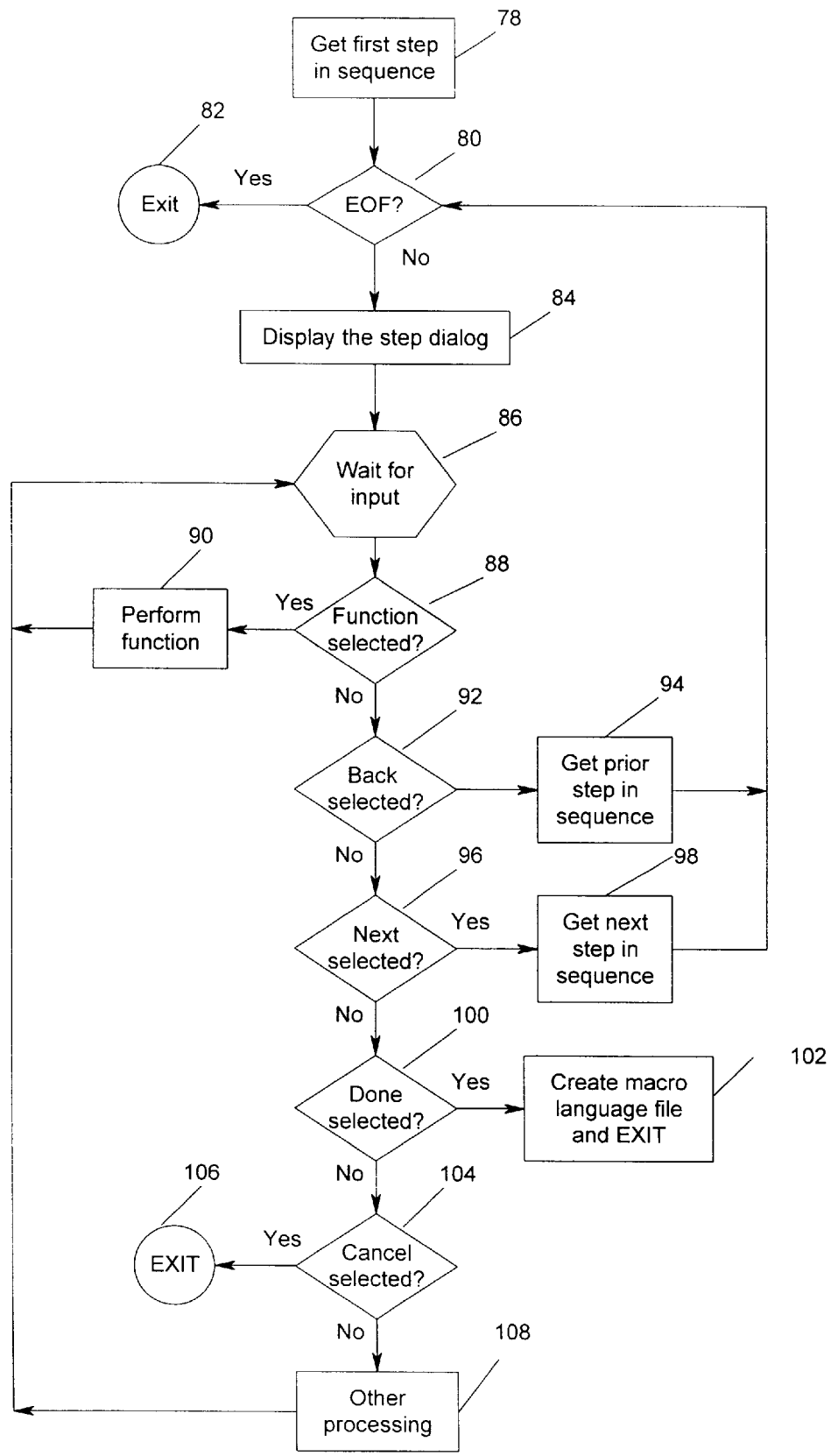
FIG. 6 is a flowchart that illustrates the general logic to perform a sequence of steps for the Web Sizing Assistant.

FIG. 6 is a flowchart that illustrates the general logic to perform a sequence of steps for the Web Sizing Assistant. The logic begins at block 78 when control transfers to the Web Sizing Assistant after it has been invoked or selected by the user within the DBMS 22. Block 78 represents the computer retrieving the first step in the sequence of displays of the dialog box 24 (e.g., FIG. 4A) associated with the Web Sizing Assistant. Block 80 is a decision block that represents the computer determining whether there are no more steps in the sequence associated with the Web Sizing Assistant. If so, control transfers to Block 82 to terminate the logic of the Web Sizing Assistant; otherwise, control transfers to Block 84.

Block 84 represents the computer displaying the Step X display on the monitor. Block 86 represents the computer waiting for user input (e.g., a mouse button click signifying selection of a function). Thereafter, control passes to blocks 88–108 to identify the input and perform associated functions.

Block 88 is a decision block that represents the computer determining whether the user input is a function selected from the Step X display. If so, control transfers to Block 90; otherwise, control transfers to Block 92. Block 92 represents the computer performing the selected function, e.g., any of the functions or group of functions described above in conjunction with FIGS. 4A–4F excluding the functions associated with the Back, Next, Done, and Cancel buttons. Thereafter, control transfers back to Block 86.

Block 92 is a decision block that represents the computer determining whether the user input is a "Back" function selected from the Step X display. If so, control transfers to Block 94; otherwise, control transfers to Block 96. Block 94 represents the computer retrieving the prior Step X display in the sequence. Thereafter, control transfers back to Block 80.

Block 96 is a decision block that represents the computer determining whether the user input is a "Next" function selected from the Step X display. If so, control transfers to Block 98; otherwise, control transfers to Block 100. Block 98 represents the computer retrieving the next Step X display in the sequence. Thereafter, control transfers back to Block 80.

Block 100 is a decision block that represents the computer 100 determining whether the user input is a "Done" function selected from the Step X display. If so, control transfers to Block 102; otherwise, control transfers to Block 104. Block 102 represents the computer creating and storing the macro language file 20 and terminating the logic of the Web Sizing Assistant.

Block 104 is a decision block that represents the computer determining whether the user input is a "Cancel" function selected from the Step X display. If so, control transfers to Block 106; otherwise, control transfers to Block 108. Block 106 represents the computer terminating the logic of the Web Sizing Assistant.

Block 108 represents the computer performing other processing for other user input. Thereafter, control transfers back to Block 86.

Figure 7:
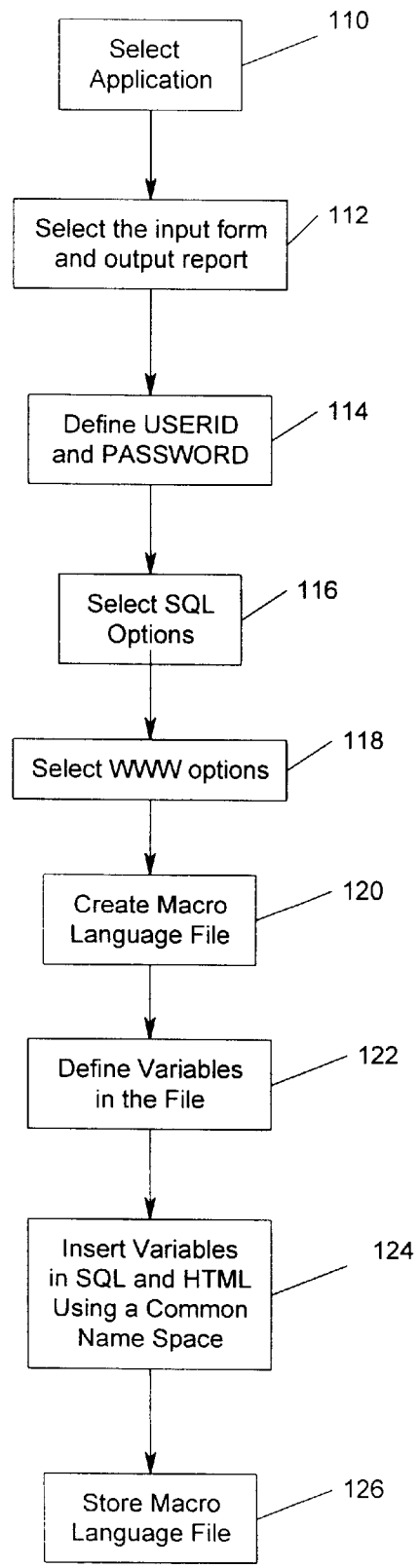
FIG. 7 is a flowchart illustrating the steps involved in creating macro language files using the Web Sizing Assistant described in FIGS. 4A–4F and FIGS. 5–6.

FIG. 7 is a flowchart further illustrating the steps involved in creating macro language files 20 using the Web Sizing Assistant described in FIGS. 4A–4F and FIGS. 5 and 6. Block 110 represents the selection of a document (i.e., application) for creating a macro language file 20 in the display of the dialogue box 24 of FIG. 4A. Block 112 represents the selection of the Input form and Report form for the macro language file 20 in the dialog box of FIG. 4B. Block 114 represents the definition of the USERID, PASSWORD, database name, and path and file name, for the macro language file 20 in the dialog box of FIG. 4C. Block 116 represents the selection of various SQL options, including Show SQL, Search Type, Error/Warning Message Table, and Maximum number of rows to return, for the macro language file 20 in the dialog box of FIG. 4D and the Error Code Table of FIG. 4E. Block 118 represents the selection of various WWW options, including image path, macro directory, executable name, case conversion, and form method, for the macro language file 20 in the dialog box of FIG. 4F. Block 120 represents the creation of the macro language file 20. Block 122 represents the definition of variables in the macro language file 20 using the %DEFINE directive. Block 124 represents the insertion of the variables into the SQL and HTML statements in the macro language file 20 using a common name space, wherein a common name space indicates that the same variables may be used in either SQL or HTML statements in order to provide cross-language variable substitution capabilities. Block 126 represents the macro language file 20 being stored on a disk drive or other peripheral attached to the DB2 WWW gateway 16.

Figure 8:
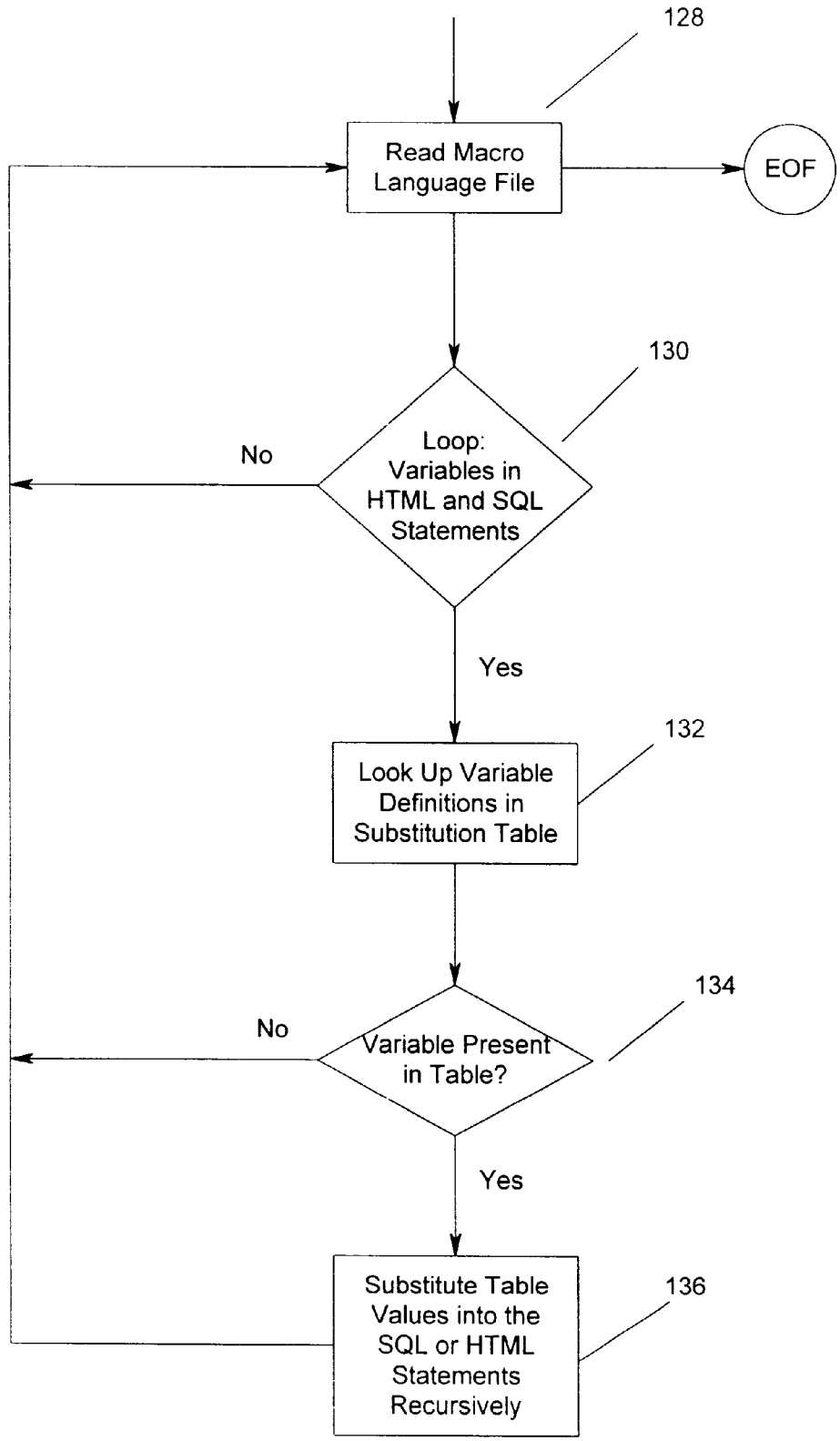
FIG. 8 is a flowchart illustrating the steps involved in using macro language files to provide access to a relational database according to the present invention.

FIG. 8 is a flowchart illustrating the steps involved in using macro language files 20 to provide access to a relational database according to the present invention. Block 128 represents the DB2 WWW gateway 16 reading a macro language file 20 in response to a command received from a Web browser 12 via a Web server 14. As each record is read from the macro language file 20, block 130 examines the record to determine whether or not a variable is found in the HTML or SQL statements stored in the macro language file 20. If so, control transfers to block 132, which looks up variable definitions in the variable substitution table maintained by the DB2 WWW gateway 16. Block 134 is a decision block that determines whether or not the variable can be found in the variable substitution table. If not, no substitution occurs and control transfers to block 84 to read additional records from the macro language file 20. Otherwise, control transfers to block 136, which represents the DB2 WWW gateway 16 substituting the table values for the variable into the SQL or HTML statements in a recursive manner.

Figure 9:
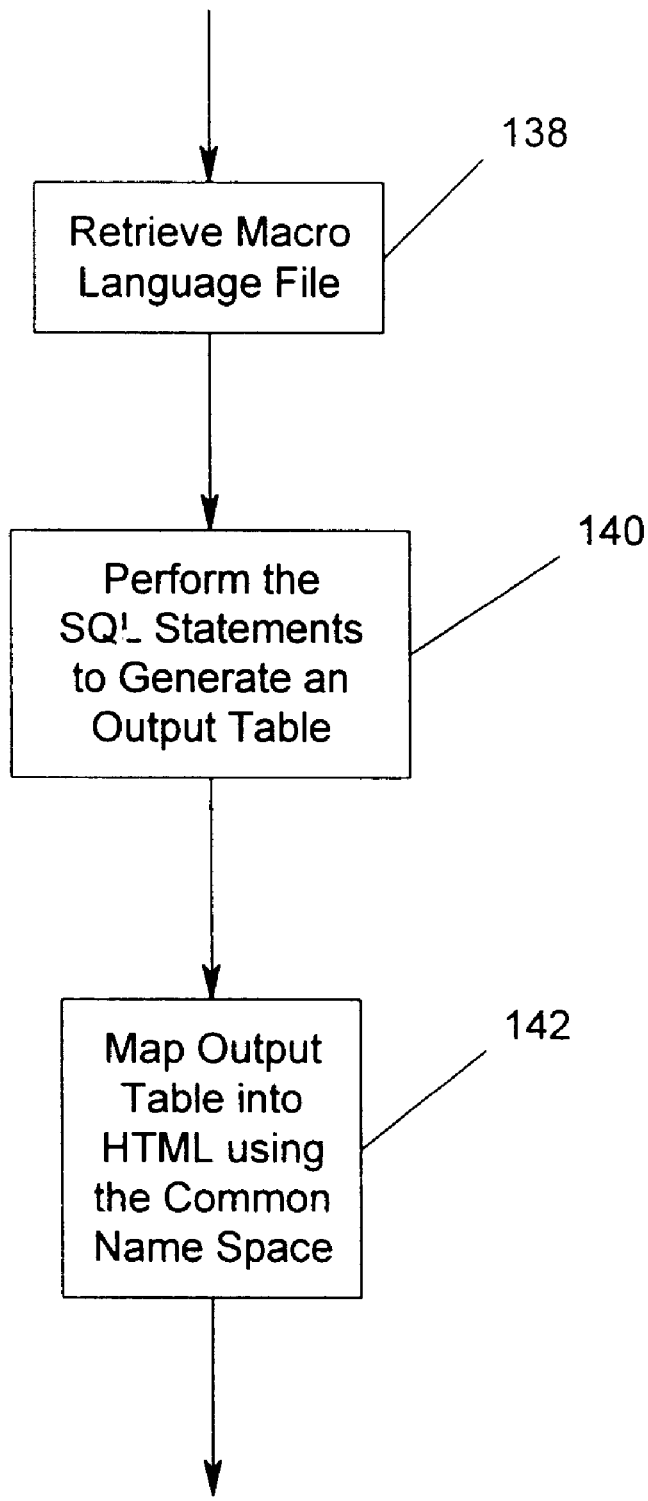
FIG. 9 is a flowchart illustrating the steps involved in using a macro language file to generate a dynamic SQL query and then merging the results of that query into an HTML Report form.

FIG. 9 is a flowchart illustrating the steps involved in using a macro language file 20 to generate a dynamic SQL query and then merging the results of that query into an HTML Report form. Block 138 represents the DB2 WWW gateway 16 retrieving the indicated macro language file 20, extracting the SQL statements therefrom, and performing the necessary variable substitution using the input data from the user. Block 140 represents the DB2 WWW gateway 16 transmitting the SQL statement to the RDBMS server 18 and the RDBMS server 18 performing the SQL statement to generate an output table. The output table is then returned to the DB2 WWW gateway 16 processing. Block 142 represents the DB2 WWW gateway 16 mapping the output table into the HTML Report form from the macro language file 20 using the common name space. Again, the common name space indicates that variables may be embedded in the HTML Report form that allows cross-language variable substitution to occur, so that the output table is correctly merged into the HTML Report form. Thereafter, the DB2 WWW gateway 16 transmits the HTML Report form to the Web server 14 and then on to the Web browser 12 for presentation to the user.

EXAMPLE MACRO LANGUAGE FILES

The use of the macro language and variable substitution mechanism of the present invention are best illustrated by the examples set forth below. In these examples, the macro language files 20 have an extension ".d2w". The DB2 WWW gateway 16 looks for file names with this extension when opening macro language files 20 for processing.

Example 1
HTML-to-SQL Substitution

Consider the following macro language file "example 1" using HTML to SQL variable substitution:

```
%HTML_INPUT
{
<FORM METHOD = "post" ACTION = "http://ibm.com
        /db2www/example1/report">
Please select one or more fields:
<SELECT NAME="Fields" MULTIPLE SIZE=4>
<OPTION>Name
<OPTION>Address
<OPTION>Phone
<OPTION>Fax
</SELECT>
<INPUT TYPE="submit" Value="Submit Query">
<FORM>
%}
%DEFINE DATABASE="CUSTOMERDB"
%SQL SELECT $(Fields) FROM CustomerTb1
%HTML_REPORT
{
Information Requested:
%EXECSQL{%}
<A HREF="...">Return to Homepage</A>
%}
```

The macro language file 20 above may first be invoked by the URL "http://ibm.com/db2www/example1/input", which is embedded as an anchor reference in an HTML home page. When the end user clicks on the anchor item, the DB2 WWW gateway 16 is activated, and the user is presented with the HTML Input form.

The macro language file 20 above allows the user to select a field from the customer table. Multiple fields, such as "Name" and "Phone", may be selected. When the user clicks on the "[Submit Query]" button, the macro language file is again processed by the form action "http://ibm.com/db2www/example1/report". The user inputs obtained from the HTML <SELECT> statement are substituted into the $(Fields) in the SQL clause. The submission of the HTML Input form returns the user-selected result in the form "Fields Name & Fields=Phone". The variable "$(Fields)" in the SQL statement are replaced with "Name, Phone" (including the comma).

When the HTML report section is processed, the HTML text proceeding the %EXECSQL is printed first, followed by a default query table report, and the HTML text after the report. The report is displayed as follows:

```
Information Requested:
Name                    Phone
-------                 ---------
Smith, John             415-555-1212
Doe, David              408-555-1212
[Return to Home Page]
```

Example 2
Conditional and List Variables

Consider the following macro language file 20:

```
%HTML_INPUT
{
Specify Search string patterns for
Name: <INPUT TYPE="text" NAME="SubString1">
Addr: <INPUT TYPE="text"NAME="SubString2">
%}
%DEFINE
{
%LIST "and" Condition
Condition = "Name LIKE ""$(SubString1)"""
Condition = "City LIKE ""$(SubString2)"""
WhereClause = Condition ? "WHERE $(Condition)":"
%}
%DEFINE DATABASE="CUSTOMERDB"
%SQL
{
SELECT Name, City FROM CustomerTb1
    $(WhereClause)
%}
```

The HTML Input form asks the users to type in the string patterns to match with the database fields Name and Addr. The user may type in one, two or no pattern at all. The variable condition is declared to be a list variable, and the variable WhereClause is conditionally assigned. Thus, $(WhereClause) will be substituted with one of the following values:

1. NULL (if the user leaves both inputs empty);
2. WHERE Name LIKE "S%" (if the user types in S% for Name and leave Addr empty); or
3. WHERE Name LIKE "S%" AND City LIKE "San Jose" (if the user types in S% for Name and San Jose for City).

Example 3
HTML-to-SQL Substitution

Consider the following macro language file 20 named "example3" using HTML to SQL variable substitution:

```
%DEFINE DATABASE="CUSTOMERDB"
%SQL SELECT $(Fields) FROM CustomerTbl
%HTML_INPUT
{
```

-continued

```
<FORM METHOD = "post" ACTION = "http://ibm.com/
db2www/example3/report">
Please select one or more fields:
<SELECT NAME="Fields" MULTIPLE SIZE=4>
<OPTION>Name
<OPTION>Address
<OPTION>Phone
<OPTION>Fax
</SELECT>
<INPUT TYPE="submit" Value="Submit Query">
<FORM>
%}
```

The macro language file 20 is invoked by the following URL: "http://ibm.com/db2www/example3/input", which is embedded as an anchor reference in an HTML home page. When the end-user clicks on the anchor, the DB2 WWW gateway 16 is activated via the URL, and the user is presented with the HTML Input form from the macro language file 20. The macro language file 20 allows the user to select a field from the customer table file named "CustomerTbl". Multiple fields, such as "Name", "Address", "Phone", and "Fax" may be selected. The user inputs obtained from the HTML <SELECT>statement are substituted into the $(Fields) in the SQL clause. The HTML Input form returns the user-selected result in a form such as "Fields=Name & Fields=Phone". The resulting $(Fields) in the SQL statement are replaced with "Name, Phone" (including the comma). Since the %HTML_REPORT directive is missing from the macro language file 20, a default table output is displayed as follows (assuming the fields Name and Phone are selected):

| Name | Phone |
|---|---|
| Smith, John | 415-555-1212 |
| Doe, David | 408-555-1212 |
| ... | |

Example 4
DEFINE Substitution

Consider the following macro language file 20 named "example4" using alias substitution:

```
%DEFINE Tbl="CustomerTbl"
%DEFINE Htxt="<H1>Customer Report</H1>"
%DEFINE DATABASE="CUSTOMERDB"
%SQL SELECT Name FROM $(Tbl)
%HTML_INPUT
{
$(Htxt)
...
%}
```

In this macro language file 20, the variable $(Tbl) in the %SQL section is substituted with "CustomerTbl" and the variable $(Htxt) in the %HTML_INPUT section is substituted with the text string "<H1>Customer Report</H1>".

Example 5
HTML Report Form Substitution

Consider the following macro language file 20 using Report form substitution:

```
%DEFINE DATABASE="CUSTOMERDB"
%SQL SELECT Name, Phone, Fax FROM CustomerTbl
%HTML_REPORT
{
Address Query Result:"
%EXECSQL
{
$(FN1) : $(FV1)
Phone: $(FV2) Fax: $(FV3)
----------------------------------------------
Total records retrieved: $(NR)
%}
```

When invoked by the URL: "http://ibm.com/db2www/example5/report", the following Report form will be displayed to the user:

Address Query Result:
Name: Smith, John
Phone: 415-555-1212 Fax: 415-555-1212
----------------------------------------------
Name: Doe, David
Phone 408-555-1212 Fax: 408-555-1212
----------------------------------------------
Total records retrieved: 2

Example 6
Embedded Links to Other Macro Language Files

Due to the flexible variable substitution mechanism of macro language items displayed in the Report form may link to other URLs, which include other HTML forms, CGI programs, or other macro language files. Examples of such linkages are provided below in macro language file 20 named "example6a":

```
%DEFINE DATABASE="CUSTOMERDB"
%SQL
{
SELECT Name, Company FROM CustomerTbl
WHERE Name LIKE "$(custname)"
%}
%HTML_INPUT
{
<FORM METHOD = "post" ACTION = "http://ibm.com/
db2www/example6a/report">
Enter name of customer for search:
<INPUT Name="custname">
<INPUT Type="Submit" Value="Search Now">
</FORM>
%}
%DEFINE URLprefix="http://ibm.com/"
%HTML_REPORT
{
Query Results. Please click on customer name to
get detailed description of customer information.
%EXECSQL
{
Name:<A HREF = "$(URLprefix)/db2www/
example6b/report/cust = $(V1)">
$(FV1)</A>
Company: $(FV2)
%}
<A HREF="$(URLprefix)/homepage.html>
Go to home page</A>
%}
```

When invoked by the URL: "http://ibm.com/db2www/example6a/input", the following Input form will be displayed to the user:

Enter name of customer for search: __ [Search Now]

The user enters the name of the customer for the query into the Input form, and then selects the "[Search Now]" button. The Input form invokes the DB2 WWW gateway 16 with the URL: "http://ibm.com/db2www/example6a/report", and the following Report form is displayed to the user:

Query Results. Please click on customer name to get detailed description of customer information.

Name: [John Smith]

Company: Mikrotuf Corporation

Name: [David Doe]

Company: Orakel Limited

[Go to home page]

The text between the brackets are displayed as highlighted hyperlinks that may be selected by the user. For example, if the user selects "[Go to home page]", then he or she will jump to the HTML page "homepage.htm1".

Alternatively, if the user selects "[John Smith]", then DB2 WWW gateway is invoked with the following URL: "http://ibm.com/db2www/example6b/report/[?cust=John Smith]", and the following macro language file 20 is retrieved:

```
%DEFINE DATABASE="CUSTOMERDB"
%SQL
{
SELECT Name, Title, Phone FROM CustomerTbl
      WHERE Name LIKE "$(cust)"
%}
%HTML_REPORT
{
Detailed customer information
---------------------------------------------
%EXECSQL
{
Name  = $(FV1)
Title = $(FV2)
Phone = $(FV3)
%}
%}
```

After the SQL query in the macro language file 20 is executed, with "John Smith" replacing the "$(cust)" variable, then the HTML Report form is displayed for the user:

```
Detailed customer information
-------------------------------------------
Name  = John Smith
Title = VP of Research and Development
Phone = 415-555-1212
```

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the HTTP protocol or the HTML or SQL language standards could benefit from the present invention.

In summary, the present invention discloses a method, apparatus, and article of manufacture for creating macro language files for executing SQL queries in a relational database management system via the World Wide Web of the Internet. In accordance with the present invention, Web users can request information from RDBMS software via HTML input forms, which request is then used to create an SQL statement for execution by the RDBMS software. The results output by the RDBMS software are themselves transformed into HTML format for presentation to the Web user.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for creating macro language files for executing Structured Query Language (SQL) queries in a computer-implemented relational database management system via a network, comprising the steps of:

(a) creating a HyperText Markup Language (HTML) input form to be displayed on a browser executed by a client computer in the network, wherein the HTML input form formats and transmits data entered by the user to a server computer in the network, the data entered by the user is substituted from the HTML input form into a dynamic SQL query using a common name space, the common name space comprising variables found in both the dynamic SQL query and the HTML input form;

(b) creating a HyperText Markup Language (HTML) report form to be displayed by the browser executed by the client computer in the network, wherein the HTML report form formats and transmits data returned by the computer-implemented relational database management system in response to the data entered by the user into the HTML input form and transmitted to the server computer, the data returned by the computer-implemented relational database management system is substituted from the dynamic SQL query into the HTML report form using a common name space, the common name space comprising variables found in both the dynamic SQL query and the HTML report form; and (c) merging the HTML input form, dynamic SQL query, and HTML report form into the macro language file;

wherein a macro file developer creates the input form and report form via a dialog box having a plurality of inputs including a first input for opening a document to be displayed; a second input for choosing the input and output display format of the displayed document; a third input for receiving user information to access the database; a fourth input for selecting searching and error options; and a fifth input for directing the storage of the macro file.

2. The method of claim 1 above, wherein the macro language file comprises an SQL command section, an HTML input form section, and an HTML report form section.

3. The method of claim 1 above, further comprising the steps of:

displaying a dialog box on a monitor attached to a computer, wherein the dialog box comprises a step-by-step procedure for creating the macro language file; and accepting user input into the computer in response to the step-by-step procedure and creating the macro language file using the user input.

4. The method of claim 3 above, further comprising the steps of displaying a user interface on the monitor and accepting user input via the displayed user interface to specify one or more documents used to define the HTML input form, dynamic SQL query, and HTML output form.

5. The method of claim 3 above, further comprising the steps of displaying a user interface on the monitor and accepting user input via the displayed user interface to specify one or more HTML input forms and one or more HTML report forms to associate in the macro language file.

6. The method of claim 5 above, wherein a list of all available HTML input forms and report forms are displayed.

7. The method of claim 5 above, wherein the HTML report form is used as the HTML input form.

8. The method of claim 3 above, further comprising the steps of displaying a user interface on the monitor and accepting user input via the displayed user interface to specify one or more images to use for a background of both the HTML input and report forms.

9. The method of claim 3 above, further comprising the steps of displaying a user interface on the monitor and accepting user input via the displayed user interface to specify a user identifier and password to be used in accessing the computer-implemented relational database management system.

10. The method of claim 9 above, wherein the user identifier and password are common for all users.

11. The method of claim 9 above, wherein the user identifier and password are entered by each user at a prompt.

12. The method of claim 3 above, further comprising the steps of displaying a user interface on the monitor and accepting user input via the displayed user interface to specify a database name to be used by the relational database management system.

13. The method of claim 3 above, further comprising the steps of displaying a user interface on the monitor and accepting user input via the displayed user interface to specify a path for storing the macro language file.

14. The method of claim 3 above, further comprising the steps of displaying a user interface on the monitor and accepting user input via the displayed user interface to specify whether the dynamic SQL query is displayed to the user.

15. The method of claim 3 above, further comprising the steps of displaying a user interface on the monitor and accepting user input via the displayed user interface to specify a type of search to be performed by the dynamic SQL query.

16. The method of claim 15 above, wherein the type of search is specified by the user.

17. The method of claim 15 above, wherein the type of search comprises "ANDed" input fields of the HTML input form.

18. The method of claim 15 above, wherein the type of search comprises "ORed" input fields of the HTML input form.

19. The method of claim 3 above, further comprising the steps of displaying a user interface on the monitor and accepting user input via the displayed user interface to specify a maximum number of rows to display in the HTML report form.

20. The method of claim 3 above, further comprising the steps of displaying a user interface on the monitor and accepting user input via the displayed user interface to define error and warning messages for error codes returned by the relational database management system.

21. The method of claim 3 above, further comprising the steps of displaying a user interface on the monitor and accepting user input via the displayed user interface to specific one or more characteristics of the macro language selected from a group comprising an image path, a subdirectory for storing the macro language file, and an executable name of the macro language file.

22. The method of claim 3 above, further comprising the steps of displaying a user interface on the monitor and accepting user input via the displayed user interface to specify whether the data entered by user is case converted before being transmitted to the server computer.

23. The method of claim 3 above, further comprising the steps of displaying a user interface on the monitor and accepting user input via the displayed user interface to specify a method of transmitting the data entered by the user into the Input form to the server computer.

24. An apparatus for creating macro language files for executing Structured Query Language (SQL) queries in a computer-implemented relational database management system via a network, comprising:

(a) a computer;

(b) one or more computer programs, executed by the computer, for:

(1) creating a HyperText Markup Language (HTML) input form to be displayed on a browser executed by a client computer in the network, wherein the HTML input form formats and transmits data entered by the user to a server computer in the network, the data entered by the user is substituted from the HTML input form into a dynamic SQL query using a common name space, the common name space comprising variables found in both the dynamic SQL query and the HTML input form;

(2) creating a HyperText Markup Language (HTML) report form to be displayed by the browser executed by the client computer in the network, wherein the HTML report form formats and transmits data returned by the computer-implemented relational database management system in response to the data entered by the user into the HTML input form and transmitted to the server computer, the data returned by the computer-implemented relational database management system is substituted from the dynamic SQL query into the HTML report form using a common name space, the common name space comprising variables found in both the dynamic SQL query and the HTML report form; and (3) merging the HTML input form, dynamic SQL query, and HTML report form into the macro language file;

wherein a macro file developer creates the input form and report form via a dialog box having a plurality of inputs including a first input for opening a document to be displayed; a second input for choosing the input and output display format of the displayed document; a third input for receiving user information to access the database; a fourth input for selecting searching and error options; and a fifth input for directing the storage of the macro file.

25. An article of manufacture comprising a computer program carrier readable by a computer and embodying one or more computer programs that when executed by the computer causes the computer to perform method steps for creating macro language files for executing Structured Query Language (SQL) queries in a computer-implemented relational database management system via a network, the method comprising the steps of:

(a) creating a HyperText Markup Language (HTML) input form to be displayed on a browser executed by a client computer in the network, wherein the HTML input form formats and transmits data entered by the user to a server computer in the network, the data entered by the user is substituted from the HTML input form into a dynamic SQL query using a common name space, the common name space comprising variables found in both the dynamic SQL query and the HTML input form;

(b) creating a HyperText Markup Language (HTML) report form to be displayed by the browser executed by the client computer in the network, wherein the HTML report form formats and transmits data returned by the computer-implemented relational database management system in response to the data entered by the user into the HTML input form and transmitted to the server computer, the data returned by the computer-implemented relational database management system is substituted from the dynamic SQL query into the HTML report form using a common name space, the common name space comprising variables found in both the dynamic SQL query and the HTML report form; and (c) merging the HTML input form, dynamic SQL query, and HTML report form into the macro language file;

wherein a macro file developer creates the input form and report form via a dialog box having a plurality of inputs including a first input for opening a document to be displayed; a second input for choosing the input and output display format of the displayed document; a third input for receiving user information to access the database; a fourth input for selecting searching and error options; and a fifth input for directing the storage of the macro file.

* * * * *